April 7, 1953   E. L. DUSKEY   2,633,815
DOUGH ROLLING DEVICE
Filed June 15, 1948
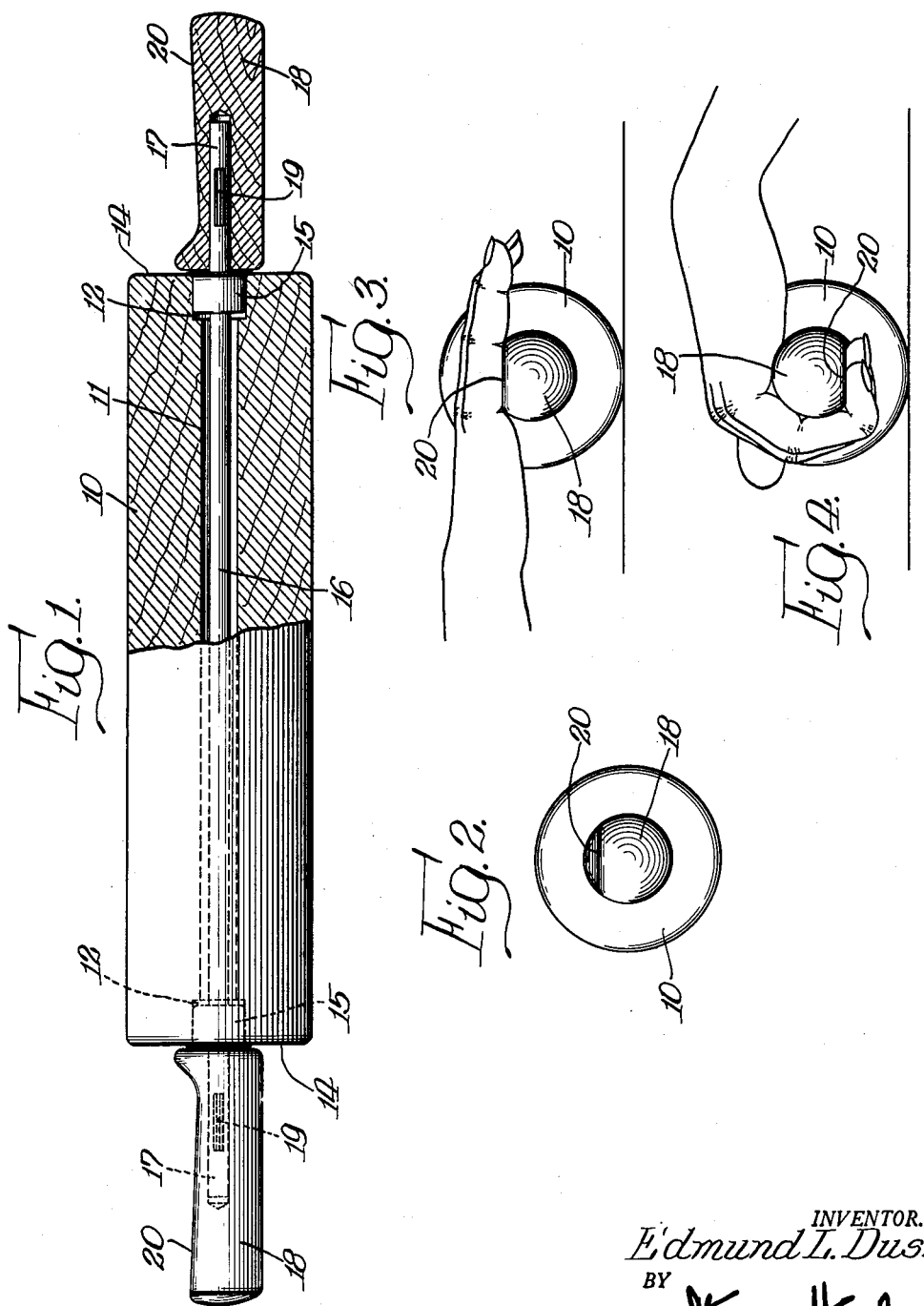
INVENTOR.
Edmund L. Duskey,
BY
Atty.

Patented Apr. 7, 1953

2,633,815

UNITED STATES PATENT OFFICE 2,633,815

DOUGH ROLLING DEVICE

Edmund L. Duskey, Western Springs, Ill., assignor to Ekco Products Company, Chicago, Ill., a corporation of Illinois Application June 15, 1948, Serial No. 33,161

4 Claims. (Cl. 107—50)

This invention relates to new and useful improvements in rolling pins of the type wherein a cylindrical roller has a handle projecting outwardly axially from each end thereof and said handles are connected for rotation in unison relative to the roller.

It is an object of this invention to provide a rolling pin of this character wherein each handle is biased into a predetermined rotated position.

It is a further object of this invention to provide each of said handles with a flattened external surface extending lengthwise of and in such proximity to the axis of rotation of said handles as to bias the handles into a position wherein the flattened surface faces upwardly when the axis of the handle is in horizontal position.

With the above and other objects in view, the invention consists in the novel features of construction, combination and arrangement of parts hereinafter more fully set forth, pointed out in the claims and shown in the accompanying drawings in which:

Fig. 1 is a side view, partly in elevation and partly in vertical section, illustrating the general arrangement and assembly of parts of a dough rolling device embodying the features of this invention.

Fig. 2 is an end elevational view of the article shown in Fig. 2.

Fig. 3 is similar to Fig. 2 illustrating an arrangement of an operator's hand applied thereto as assumed in one rotated position of the handle.

Fig. 4 is similar to Fig. 3 illustrating an arrangement of the fingers of the operator's hand as assumed in a different rotated position of the handle.

The present invention, as shown, comprises a cylindrical roller 10, of wood or other suitable material adapted to be used in connection with the preparation of an article of pastry. The roller 10 is provided with an axial bore 11 having enlarged end portions 12 exposed at the end surfaces 14 of the roller. A ball bearing assembly including an outer housing or shell 15 of metal or other suitable material is secured within the enlarged end portions 12 of the bore 11 so as to dispose the outer edge of the shell 15 in a plane substantially flush with the end surfaces 14 of the roller.

A rod 16 of such length as to extend the length of the bore 11 and provide an end portion 17 in protruding relation to each end surface 14 of the roller 10, is supported in the bearing assembly of each shell 15 whereby the roller 10 and rod 16 are connected for relative movement about the rod 16 as an axis. Each end portion 17 of the rod 16 provides a tang or shank on which an axially bored handle 18, of suitable material, is secured by means of lugs 19 formed integrally with said end portions 17, or other similar fastening devices.

As shown in Fig. 2, each handle 18, has its mass or weight so distributed relative to its longitudinal axis as to bias the handle into a position wherein a flattened external surface 20 thereof, extending lengthwise of said axis, faces upwardly when the roller is in operative relation to a horizontal underlying surface. Thus the portion 20 of each handle 18 presents a surface conforming to the flattened outstretched palm of the operator's hand, as shown in Fig. 3, when it is desired to exert relatively heavy pressure between the roller 10 and the article of pastry being flattened thereby. On turning the handle 18 so as to locate the flattened surface 20 in downwardly facing relation, as shown in Fig. 4, sufficient additional clearance is available below the handle to accommodate the fingers of the operator's hand while the fingers are flexed in a natural condition to grip the handle as distinguished from supporting the palm of the hand with fingers outstretched. The portion of the handle opposite said flattened surface 20 is preferably of outward convexly curved transverse external contour so as to more readily conform to the naturally flexed position of the fingers.

The weight of the handle is sufficiently light to permit easy and quick adjustment of the surface 20 between upward and downward facing positions. The roller 10 may accordingly be applied to its task of preparing pastry goods of desired thinness, with strokes of accurately controlled pressure and evenness with the aid of a dough rolling device having handles constructed and arranged in accordance with the present invention.

This invention may be developed within the scope of the following claims without departing from the essential features of the said invention, and it is desired that the specification and drawing be read as being merely illustrative of a practical embodiment of the said invention and not in a strictly limiting sense.

What is claimed is:

1. A dough rolling device comprising a cylindrical roller, each end of said roller having a solid handle projecting outwardly axially therefrom, means connecting the handles to the roller for rotation in unison relative to the roller, each handle having its mass so distributed eccentrically of its axis of rotation as to bias the same into a predetermined rotated position.

2. A dough rolling device comprising a cylindrical roller, each end of said roller having a handle projecting outwardly axially therefrom, means connecting the handles to the roller for rotation in unison relative to the roller, each handle having a flattened external surface extending lengthwise of and in such proximity to the axis of rotation of the handle as to bias the handle into a position wherein the flattened surface faces upwardly when the axis of the handle is in horizontal position.

3. A dough rolling device comprising a cylindrical roller, each end of said roller having a handle projecting outwardly axially therefrom, means connecting the handles to the roller for rotation in unison relative to the roller, each handle having a flattened external surface extending lengthwise of the axis of rotation of the handle, and an outward convexly curved external contour on the side thereof opposite said flattened surface and extending continuously through an arc of at least 180 degrees at a distance away from said axis of rotation greater than the distance of said flattened surface from said axis of rotation.

4. A dough rolling device comprising a cylindrical roller, each end of said roller having a handle projecting outwardly axially therefrom, means connecting the handles to the roller for rotation in unison relative to the roller, each handle having a flattened external surface extending lengthwise of the axis of rotation of the handle in such proximity to the axis of rotation as to bias the latter into a position wherein said flattened surface faces upwardly when the axis of the roller is in horizontal position.

EDMUND L. DUSKEY.

REFERENCES CITED

The following references are of record in the file of this patent:

UNITED STATES PATENTS

| Number | Name | Date |
| --- | --- | --- |
| 199,969 | Finley | Feb. 5, 1878 |
| 440,187 | Nehring | Nov. 11, 1890 |
| 643,780 | Pitcher | Feb. 20, 1900 |
| 1,158,111 | Ahlheim | Oct. 26, 1915 |
| 1,383,631 | Hoffman | July 5, 1921 |
| 1,385,916 | Harris | July 26, 1921 |
| 1,603,683 | Gale | Oct. 19, 1926 |
| 1,810,050 | Klempp | June 16, 1931 |
| 2,431,808 | Kluit | Dec. 2, 1947 |
| 2,432,792 | Ovenshire | Dec. 16, 1947 |

FOREIGN PATENTS

| Number | Country | Date |
| --- | --- | --- |
| 432,711 | France | Dec. 14, 1911 |